United States Patent
Wesemann et al.

(10) Patent No.: US 6,349,132 B1
(45) Date of Patent: Feb. 19, 2002

(54) VOICE INTERFACE FOR ELECTRONIC DOCUMENTS

(75) Inventors: Darren L. Wesemann, North Salt Lake; Dong-Kyun Nam, Midvale; Richard T. Newton, North Salt Lake, all of UT (US)

(73) Assignee: Talk2 Technology, Inc., Salt Lake City, UT (US)

( * ) Notice: Subject to any disclaimer, the term of this patent is extended or adjusted under 35 U.S.C. 154(b) by 0 days.

(21) Appl. No.: 09/464,989

(22) Filed: Dec. 16, 1999

(51) Int. Cl.[7] .............................................. H04M 1/64
(52) U.S. Cl. ............................. 379/88.17; 379/88.01; 379/88.13; 379/88.14; 379/900
(58) Field of Search .......................... 379/88.01, 88.11, 379/88.13, 88.14, 88.17, 88.22, 88.23, 900, 88.04; 704/270, 275

(56) References Cited

U.S. PATENT DOCUMENTS

| | | | | |
|---|---|---|---|---|
| 5,799,063 A | | 8/1998 | Krane ..................... | 379/88.17 |
| 5,884,262 A | * | 3/1999 | Wise et al. ................. | 704/270 |
| 5,915,001 A | * | 6/1999 | Uppaluru ................. | 379/88.22 |
| 5,953,392 A | * | 9/1999 | Rhie et al. ............... | 379/88.13 |
| 6,157,705 A | * | 12/2000 | Perrone ................... | 379/88.01 |
| 6,240,391 B1 | * | 5/2001 | Ball et al. .................... | 704/280 |
| 6,263,051 B1 | * | 7/2001 | Saylor et al. ............ | 379/88.17 |
| 6,269,336 B1 | * | 7/2001 | Ladd et al. ................. | 704/270 |

* cited by examiner

Primary Examiner—Fan Tsang
Assistant Examiner—Ovodio Escalante
(74) Attorney, Agent, or Firm—Workman, Nydegger & Seeley

(57) ABSTRACT

Methods, systems, and computer program products for providing an audio interface to electronic documents. An audio interface receives a request for electronic content from a client and retrieves the requested document. Next, the document is parsed to identify various elements, such as title, text, and links included in the document. Many of those providing electronic content include hierarchical indices to aid clients in finding documents covering a particular topic. The audio interface includes a facility to preserve, enhance, or create this hierarchical organization by mapping a document's text and links into a corresponding audio hierarchy. The client is then presented with various options from which to make a selection. Outside of this hierarchy, the client receives the document title, the number of links contained within the document, an audio representation of the document's text, and may optionally chose to hear only the links included in the document. The audio interface also includes a number of global commands to facilitate navigation.

28 Claims, 8 Drawing Sheets

My Front Page Headlines — 910

<u>Top Stories from Reuters</u> — 920
- <u>Senate Blocks Campaign Soft Money Ban</u> — 922
- <u>U.S. Indicts McDonnell Douglas Over China Deal</u> — 924
- <u>Vitamin E May Help Prevent Lung Cancer, Study Says</u> — 926

<u>Tech News from News.com</u> — 930
- <u>Congressional Spam Bill Due Today</u> — 932
- <u>Online Stores Are Points of No Returns</u> — 934
- <u>Federal Panel Calls for Net Tax Plans</u> — 936

<u>Top Sports Stories from AP</u> — 940
- <u>NL Playoffs Notebook</u> — 942
- <u>NFL Roundup</u> — 944
- <u>America's Cup Enters Third Day</u> — 946

FIG. 9

Categories —1010
    Portfolios —710
    Weather —810
    My Front Page Headlines —910

First-Level Links —1020
    Quotes —720
    Salt Lake City, UT —820
    Top Stories from Reuters —920
    Tech News from News.com —930
    Top Sport Stories from Reuters —940

Second-Level Links —1030
    DIJA —730
    NASDAQ —750
    Story Headlines —922-926, 932-936, 942-946

Text of Stories —1040

VOICE INTERFACE FOR ELECTRONIC DOCUMENTS

BACKGROUND OF THE INVENTION

1. The Field of the Invention

The present invention relates to methods, systems, and computer program products for accessing electronic documents. More specifically, the present invention relates to methods, systems, and computer program products for providing a voice interface to electronic documents.

2. The Prior State of the Art

As computers have become ubiquitous in our day-to-day activities, the advantages of storing information electronically have steadily increased. One of the primary advantages of electronically stored information is its inherent versatility. For example, editing and exchanging electronic information is greatly simplified as compared to editing and exchanging documents stored in paper form only. Furthermore, any advantage attributable to having a physical document is retained in electronic storage because a "hard copy" of an electronic document may be readily produced from the electronic version.

Another significant advantage of electronically stored documents is that of providing enhanced access to information. Over the past few years, the improved access offered by electronic documents has become so important that many organizations expend substantial resources in scanning paper documents to store them electronically. Routine facsimile transmission further exemplifies the value of electronic access to documents. Arguably, it is access to information that fuels what many refer to as the Information Age.

Today, perhaps the most prominent example of access to electronically stored information is the Internet. Literally millions of people depend on the Internet for email, banking, investing, shopping, news, entertainment, and social interaction. Not too many years ago, sharing information over the Internet was principally the domain of academicians and scientists. For members of the general public, the cryptic nature of access tools and the essentially prohibitive computer hardware requirements meant virtual anonymity for the Internet. However, the advent of hypertext navigation and the World Wide Web ("Web"), in conjunction with modestly priced and increasingly powerful personal computers, has propelled the Internet to the forefront of public attention and has made the Internet an almost indispensable source of information.

Likewise, use of early cellular telephone technology was also limited. Initially, problems included providing coverage beyond major metropolitan areas, the expense and size of cellular telephones, and the expense of airtime. As a result, cellular telephones were used mostly for vital business concerns rather than for personal matters. Over the past few years, however, the cellular industry has solved, to one degree or another, most of the problems that inhibited cellular's general acceptance. Today, cellular telephone use has dramatically increased and, for many people, is the primary means of communicating with others.

Increasing dependence on cellular telephones as a primary means of communication together with increasing dependence on the Internet as a source of information presents an unfortunate problem: a primary means of communication, the cellular telephone, does not interface well with a vital source of information, the Internet. The problem is compounded in that the hypertext navigation of the Web is visually oriented, making a computer with a relatively large screen an obvious choice for access, yet the size of cellular telephones is much more conducive to convenient portability. Frequently cellular telephones are clipped to belts or placed in pockets or purses; portable computers require their own case and a free hand to carry. Moreover, public telephones are available to those who do not carry cellular telephones, whereas public computers have a minimal presence at best.

Although the prior art includes some attempts to solve the problem of accessing electronic documents by voice, none of the prior art teachings offer the comprehensive solution provided by the present invention. Specifically, FIGS. 1 and 2 show the prior art's approaches to accessing Internet documents, approaches that have proven to be generally inadequate in many ways. The approach designated generally at 100 illustrates a Source 110 of electronic content that is accessible through Telephone 120. The content in Source 110 is written in a markup language specifically designed for telephone access.

Using Motorola's Voice extensible Markup Language ("VoxML"), the information includes explicit elements or tags for enabling voice interaction. However, requiring explicit voice elements presents a serious drawback: it provides no means for accessing content that does not include the VoxML's voice elements. Thus, VoxML provides no access to the wealth of content already available on the Web, written mostly in HyperText Markup Language ("HTML"). In other words, to provide full Web access, the entire content of the Web would need to be rewritten to include VoxML's explicit voice tags.

Moreover, VoxML's facilities for authoring voice content do not provide for using a common source to generate both audio and visual interfaces. Therefore, even if a single document contains both visual and audio elements, the elements must be maintained separately; any changes to one must be replicated in the other.

FIG. 2 shows another approach to the problem, designated as 200, that has proven to be generally inadequate. HTML Source 210, representing existing Web content, can be accessed through one of two interfaces. First, as is well known in the art, Visual Browser 220 provides a visual interface for Monitor 230. Second, Static Translation 240 provides an audio interface for Telephone 250. Static Translation 240 is a copy of at least a portion of HTML Source 210 that has been manually altered to include audio elements. Someone examines HTML Source 210, creates a corresponding audio interface, and then stores the audio interface in Static Translation 240. A user who is interested in accessing HTML Source 210 through telephone 250 interacts with the audio interface provided by Static Translation 240.

The solution of FIG. 2 has the advantage of providing an audio interface without obligating HTML content providers (e.g., providers of HTML Source 210) with the responsibility of maintaining an audio interface. However, this approach imposes new problems that may be nearly equal to the one it proposes to solve. Like the approach in FIG. 1, a significant amount of work must be devoted to identifying HTML content of interest and then modifying that. Once the content has been initially modified, each time HTML Source 210 changes, corresponding changes must be made to the Static Translation 240. Naturally, some delay will occur between the time HTML Source 210 changes and the corresponding modifications are made to Static Translation 240. For content that changes frequently, such as information regarding financial markets, frequent and constant updating is a significant burden. Moreover, because of the incredible amount of HTML content available on the Web, only a small portion could be modified to include an audio interface and placed in Static Translation 240, leaving vast Web content completely inaccessible to Telephone 250.

One area that may be particularly well-served by telephone access is the personal home page market, as it is becoming increasingly popular for content providers, such as Yahoo!, to offer personal Web home pages. These personal pages allow a user to select from a variety of content that is placed on a single Web page. For example, a user may chose to have current data regarding various financial markets, weather, sports stories, headlines, technology, calendaring, contacts, entertainment, travel, reference, etc., appear on a personal home page. By providing a single, convenient source of diverse information, these personal home pages are highly attractive.

There is no end in sight for the increasing growth of the Internet nor is it likely that the Internet's expanding importance as a source of information will diminish any time soon. Considering the corresponding growth in cellular telephone use and the cellular telephone's convenient size, providing cellular access to the Internet in particular and electronic content in general would be a great benefit. Furthermore, public telephones also could provide beneficial Internet access for those who do not carry cellular telephones. However, the prior art lacks effective methods, systems, and computer program products for providing voice or audio interfaces to electronic content.

SUMMARY OF THE INVENTION

The problems in the prior state of the art have been successfully overcome by the present invention, which is directed to methods, systems, and computer program products for providing a voice interface to electronic documents. The present invention allows for access to existing electronic content without requiring any modification to the content source. Furthermore, the present invention allows for a common content source to incorporate both a visual and audio interface, without including separate markups for each interface, making the content source more easily maintained. Although embodiments of the present invention are described as applied to Web pages in an Internet context, the invention is not limited to any particular format of electronic information or any particular network typically used for accessing electronic content.

In one preferred implementation, the present invention works with content that operates as an index to additional content, such as is typical with personal home pages. The present invention takes the content of a personal home page and creates a hierarchy of categories that are presented to a client. There is no requirement that the client is necessarily a person. For example, the client may be an intervening service needing an audio interface to electronic documents. The present invention generates an audio representation of the available categories and allows the client to select one. Navigating through the hierarchy, the client may eventually reach the bottom hierarchy level, with links pointing to content that includes text mixed with links. At this point, the present invention reports the number of links, and provides an audio representation of the text.

Because creating categories requires some knowledge of the layout for personal home pages, Web content in general will not be mapped into various categories. For unmapped content, the present invention operates as described above with respect to text mixed with links, by reporting the number of links on a page and providing an audio representation of the page's text. Alternatively, a client may choose to hear an audio representation that only includes links. In response, the client may select a link of interest to follow. The present invention also provides a variety of global commands that are available to assist navigation.

The foregoing methods, systems, and computer program products provide significant advantages over the prior art. Because the present invention provides an audio interface without requiring any modification to existing content, the telephone access will be readily available to the vast information available electronically. Moreover, the present invention also provides for organizing certain content by mapping links and text to a hierarchy of categories to aid navigation.

These and other objects, features, and advantages of the present invention will become more fully apparent from the following description and appended claims, or may be learned by practicing the invention as set forth below.

BRIEF DESCRIPTION OF THE DRAWINGS

A more extensive description of the present invention, including the above-recited features, advantages, and objects, will be rendered with reference to the specific embodiments that are illustrated in the appended drawings. Because these drawings depict only exemplary embodiments, the drawings should not be construed as imposing any limitation on the present invention's scope. As such, the present invention will be described and explained with additional specificity and detail through use of the accompanying drawings in which:

FIG. 9 shows the headlines portion of the content from FIG. 6 in greater detail;

DETAILED DESCRIPTION OF THE PREFERRED EMBODIMENTS

Figure 1:
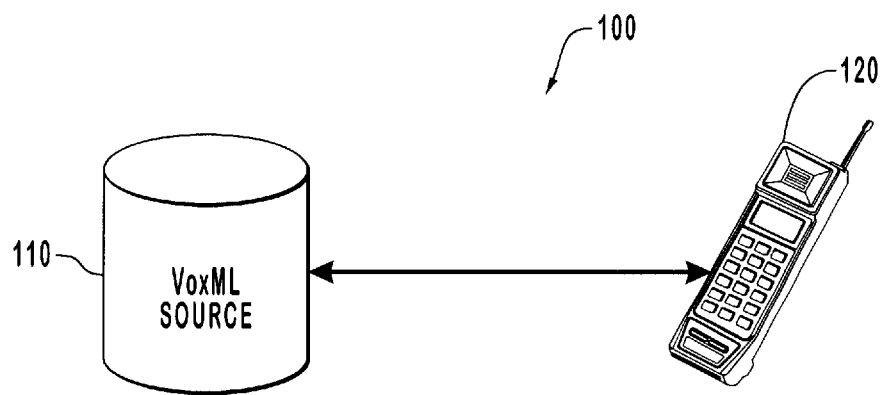
FIG. 1 is a block diagram showing a prior art solution for providing a voice interface to electronic content.
Figure 2:
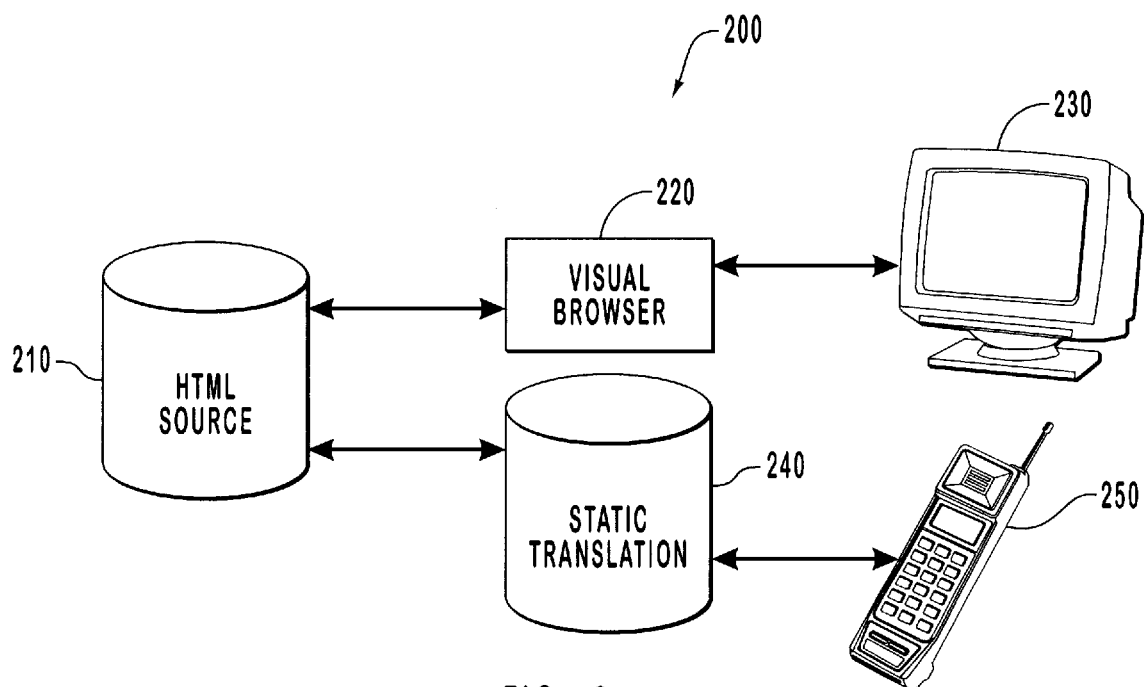
FIG. 2 is a block diagram showing another prior art solution for providing a voice interface to electronic content.

The invention is describe below with reference to drawings. These drawings illustrate certain details of specific embodiments that implement the systems, methods, and computer program products of the present invention. However, describing the invention with drawings should not be construed as imposing, on the invention, any limitations that may be present in the drawings. For example, the embodiments that follow describe the present invention in the context of Web pages usually accessed over the Internet. Nevertheless, the scope of the present invention is not limited to electronic content formatted as Web pages nor is it limited to content that is ordinarily accessed through the Internet.

The present invention relates to methods, systems, and computer program products for providing an audio interface to electronic content. Two embodiments are described below. Each embodiment is a significant advance over the prior art because no modification of the content's source is required. The first embodiment is most useful for content that is arranged as a hierarchical index, with broad topic indices leading to more specific topic indices and eventually to individual documents discussing a particular subject. The present invention creates a hierarchy of categories and indices. A corresponding audio representation allows a client to navigate through the content, where the client need not be a person. For example, the present invention could be accessible to other services needing a voice interface to electronic content. Upon reaching the bottom level in the index hierarchy, selection of a link leads to specific documents.

Reaching specific documents introduces the operation of the second embodiment. Here, the present invention identifies the number of links and provides the user with an audio representation of the document text. A client may also choose to hear the links to navigate among various documents. Depending on the initial page identified by a client, the present invention may begin operating according to either of these two embodiments. Each embodiment includes the benefits of providing an audio interface to dynamic Web content without requiring providers to modify their documents.

The embodiments of the present invention may comprise a special purpose or general-purpose computer comprising various computer hardware. Other embodiments within the scope of the present invention also include computer-readable media having computer-executable instructions or data structures stored thereon. Such computer-readable media can be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general-purpose or special-purpose computer.

When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general-purpose computer, special-purpose computer, or special-purpose processing device to perform a certain function or group of functions. The computer-executable instructions and associated data structures represent an example of program code means for executing the steps of the invention disclosed herein.

The invention will be described in the general context of computer-executable instructions, such as program modules, being executed by a computer. Generally, program modules include routines, programs, objects, components, data structures, or the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 3:
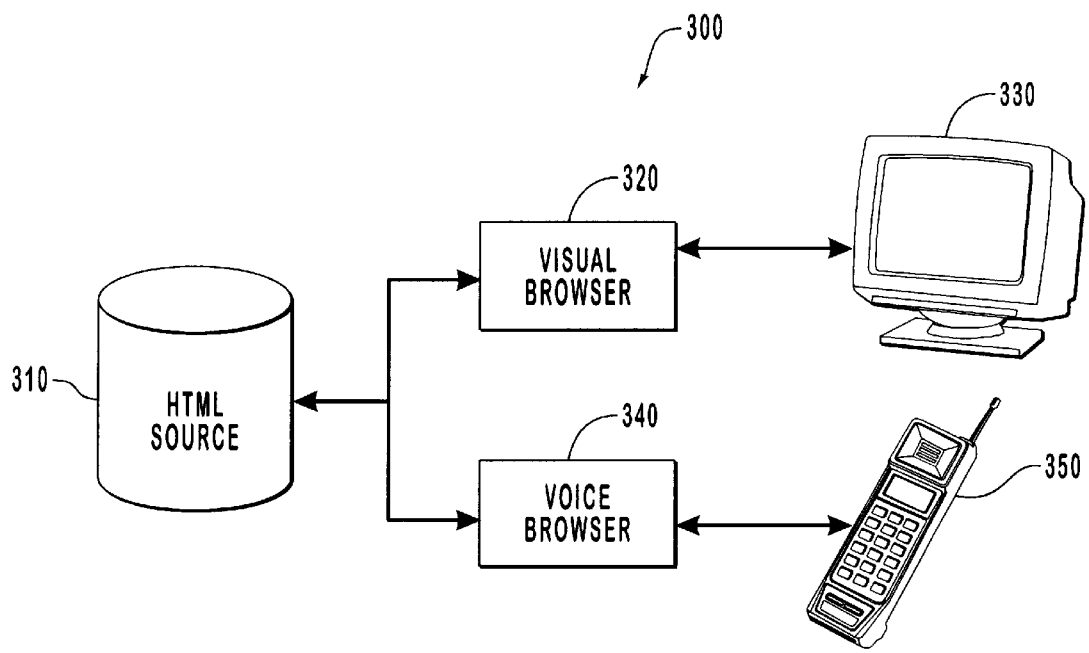
FIG. 3 is a block diagram illustrating the relationship of the present invention to other components used in accessing electronic content.

Turning now to FIG. 3, an environment, including the present invention, for accessing electronic content is referenced generally as 300. HTML Source 310 is an example of electronic content that is common to the Web. However, the invention imposes no particular requirement on the format of the content's source or on how the content typically is accessed. Visual Browser 320 accesses HTML Source 310 and provides a visual representation for Monitor 330. Visual browsers, such as Microsoft's Internet Explorer and Netscape's Navigator are both well known in the art. Voice Browser 340 provides an audio interface to HTML Source 310 that is suitable for use by Telephone 350. Alternatively, Voice Browser 340 could be used in conjunction with Visual Browser 320 to provide simultaneous visual and audio interfaces. Similarly, Visual Browser 320 could also be specialized to generate content that would be suitable for the limited space of a telephone display. Then, Visual Browser 320 and Voice Browser 340 could be used simultaneously through Telephone 350.

Figure 4:
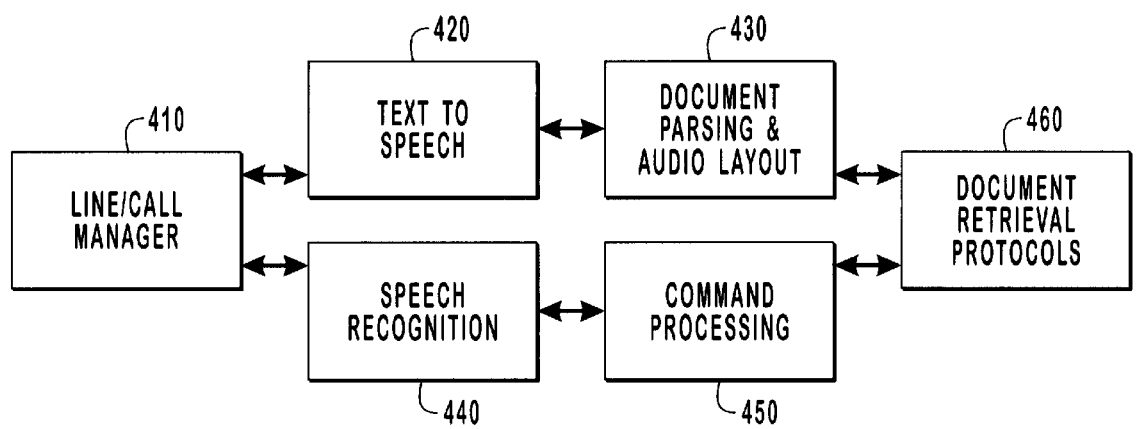
FIG. 4 is a block diagram showing increased detail of the components that make up the present invention.

FIG. 4 shows some of the basic components that make up Voice Browser 340. In addition to the following relatively brief treatment, the operation of these basic components will be described in greater detail with respect to the flow chart of FIGS. 5. Line/Call Manager 410 is responsible for establishing and maintaining telephone connections. Text to Speech 420 converts the text it receives to speech that can be communicated to a client and is an example of processor means for generating an audio representation of electronic content. Text to Speech 420 may also include some prerecorded speech. For example, prerecorded speech could be used for frequently used words, links, text or prompts. Modules for implementing both Line/Call Manager 410 and Text to Speech 420 are well known in their respective arts. Document Parsing and Audio Layout 430 receives electronic content and identifies any text and links included within the electronic content and is an example of processor means for parsing electronic documents. (Links are content elements that lead to other locations in the same document or to other documents entirely. HTML links, for example, create locations within a document's visual representation that may be selected to further explore the link's subject, such a defining a word or leading to related material.) The audio layout portion may organize certain content into a hierarchy as an aid to navigation and is an example of processor means for mapping any text and links identified into one or more categories.

Speech Recognition 440 interprets the audio or voice data received from a client so that Command Processing 450 can execute the client's request. Speech Recognition 440 is an example of processor means for receiving a spoken instruction from a client. Modules for implementing Speech Recognition 440 are well known in the respective art. Command Processing 450 may also perform various general control functions and coordinate the operation of other components. Document Retrieval Protocols 460 request and receive the electronic content of interest and are examples of processor means for obtaining electronic documents and for following links. These Document Retrieval Protocols 460 are also well known in the art of accessing electronic content, especially in the context of HTML documents.

As described in FIGS. 3 and 4, Voice Browser 340 provides an audio interface without imposing the limitations found in prior art solutions. Specifically, Voice Browser 340 does not require content providers to modify their documents to support a voice interface. Therefore, the dynamic content of the Web is available to Voice Brower 340 at the same instant it is available to Visual Brower 320. How Voice Browser 340 operates to create an audio interface is described more fully with reference to FIG. 5.

Figure 5:
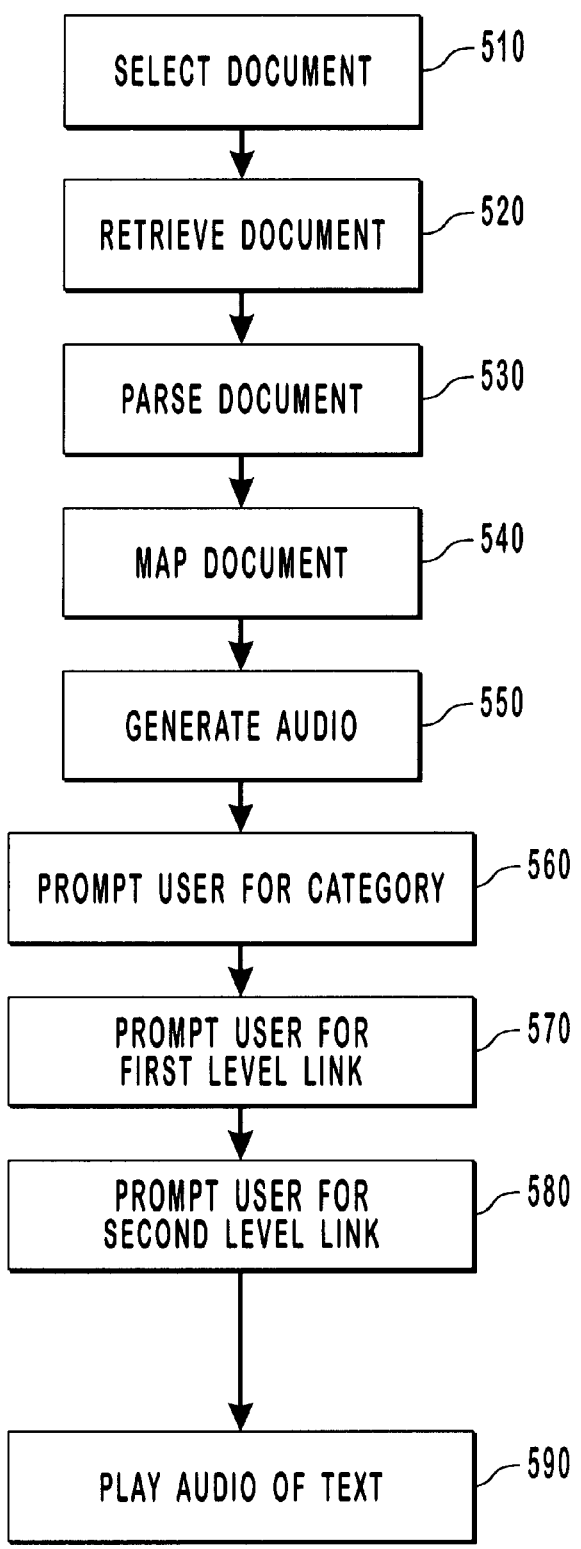
FIG. 5 is a flow chart illustrating a preferred embodiment of the present invention that includes the use of mapped categories.
Figure 6:
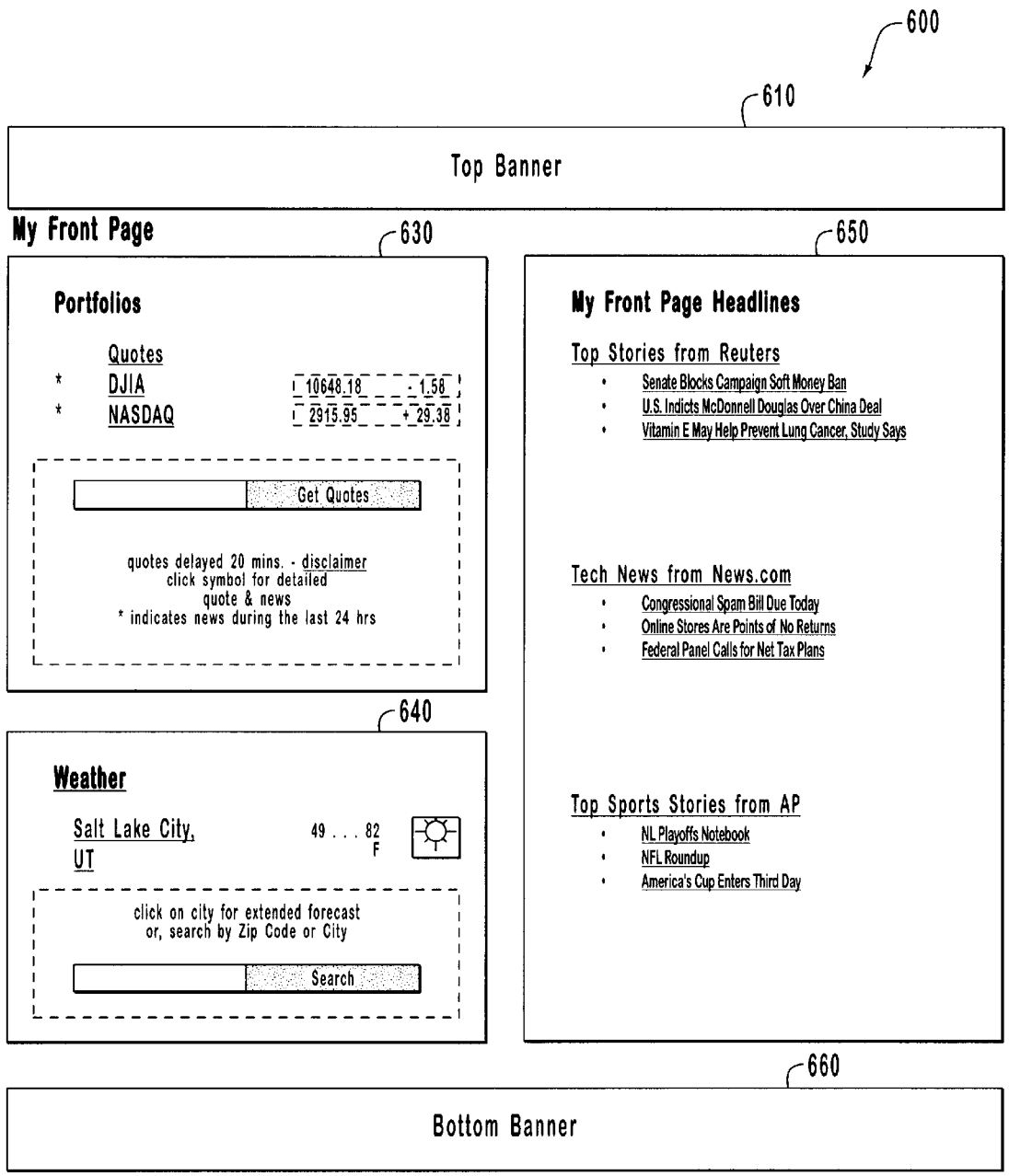
FIG. 6 is an example of electronic content that is used to describe the operation of the embodiment illustrated in FIG. 5.
Figure 7:
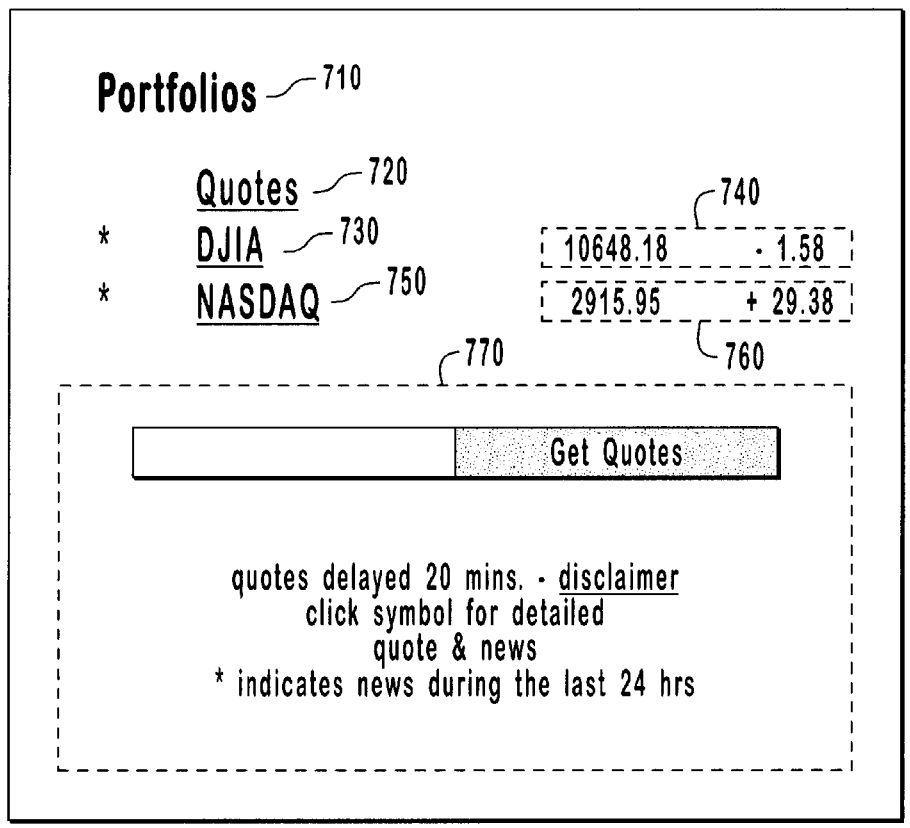
FIG. 7 shows the portfolios portion of the content from FIG. 6 in greater detail.
Figure 8:
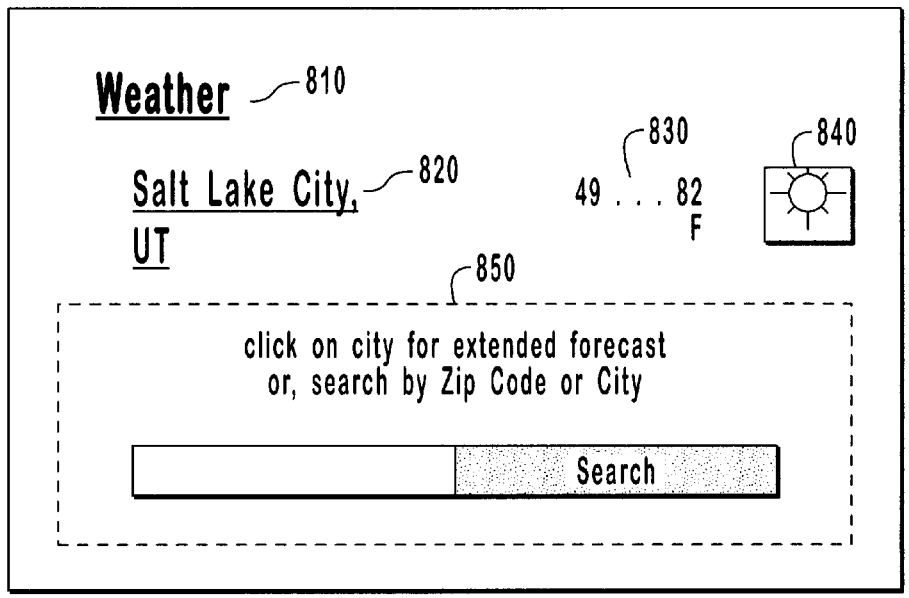
FIG. 8 shows the weather portion of the content from FIG. 6 in greater detail.

All acts shown in the flow chart of FIG. 5 will be described by using the document shown generally in FIG. 6, and more specifically in FIGS. 7–9. Because each figure number is incorporated into individual references, i.e., reference 650 appears in FIG. 6 and reference 940 appears in FIG. 9, the specific figure number may be inferred and therefore may not be explicitly identified in the discussion that follows. It should also be noted that while the steps of FIG. 5 are shown sequentially, there is no requirement that one step be completed prior to the next step beginning. For example, the prompts can be interrupted or anticipated by making a selection before the prompt finishes or before it even begins. FIG. 6 is an example of content that provides hierarchical indices leading to more textually oriented material and is suitable for enhanced mapping.

In step 510, a particular document is identified or selected. For example, Text to Speech 420 may prompt the client to select or request a desired source of information. Options include unified messaging, home page, favorites, etc. Prompts for unified messaging, home page, favorites, etc., are examples prompts that may be prerecorded and included in Text to Speech 420. In response, the client selects the personal home page shown in FIG. 6. The present invention can also include a variety of global spoken navigation commands, such as fast forward, rewind, cancel, forward, back, home, links, fax, telephone, and email. Fax, telephone, and email are instructions to fax, telephone (voice mail), or email the current document's contents, or some portion thereof, in audio and/or visual form based on what is appropriate for the particular instruction given, to someone selected from the client's contact list; the other terms retain their ordinary meaning. For example, an instruction to fax would send a visual representation of at least a portion of the document's contents to the fax recipient. Links is a request to hear a page's links only rather than its text.

Next, in step 520, Document Retrieval Protocols 460 retrieve or obtain the document. No particular protocols are imposed according to the present invention. For example, the document may be stored locally, stored on a local area network, stored on a private wide area network, or stored on the Internet. The document shown in FIG. 6 is retrieved from the Internet. Having obtained the requested document, in step 530 Document Parsing & Audio Layout 430 next parses the content to identify any title, any text, any links, and any link names included within the document. A link name is simply the text that forms the link. For example, "Weather" is the link name of Weather category 810.

Parsing the retrieved document to identify title, text, links, and link names that may be present illustrates how an audio interface may be provided without requiring changes to the document source. In conjunction with the other aspects of the present invention, this allows immediate audio access to dynamic visual content that otherwise would be unavailable in the prior art. Once parsed, in step 540 the text and links included within the document are mapped to various categories.

FIG. 6 identifies the categories present in the selected document and also shows some portions of the document that are filtered out and ignored. Top Banner 610 and Bottom Banner 660 include a variety of images and other content that is not particularly suitable for voice interaction. However, the enhanced mapping identifies three categories of information stored on the page, Portfolios 630, Weather 640, and Headlines 650. Each of the categories may also include content that is ignored. For example, Graphic 840 (see FIG. 8) is eliminated because there is no speech analog, although alternate information provided within the image tag, such as the text of the "alt" attribute, could be used. Search Fields and Instructions 770 and 850 (see FIGS. 7 & 8) are eliminated because it is impractical to enter this type of data by speaking into a telephone.

There are a variety of ways to identify the page content that should be mapped. For example, it may be possible to use HTML tags, including attributes, as an indication of various categories. The enhanced mapping feature of the present invention for My Yahoo! pages looks for a tag with a particular background color attribute. Other mappings may use other HTML tags and/or tag attributes to identify categories. While enhanced mapping beyond the default mapping provided by parsing text and links requires some degree of customization, a single mapping can be used for all corresponding pages provided by a site. Thus, a single My Yahoo! enhanced mapping provides enhanced mapping for all My Yahoo! pages.

Figures 10, 11:
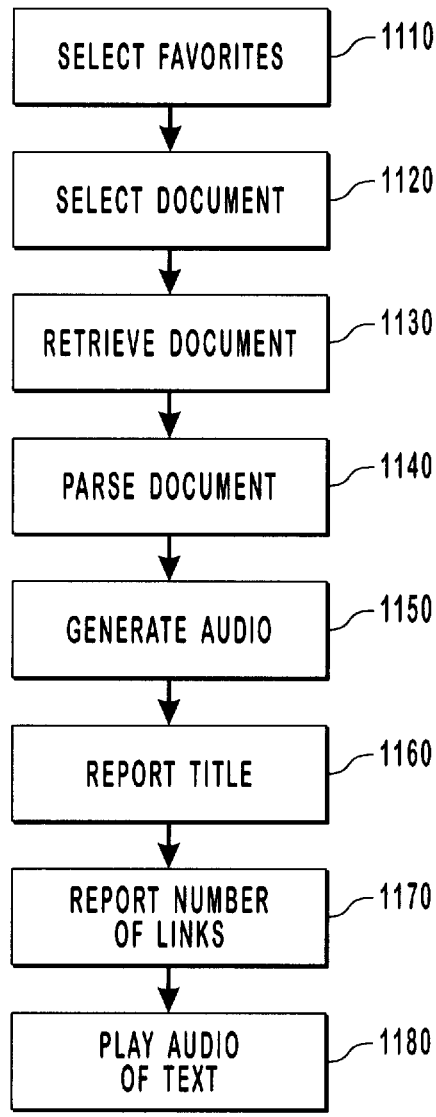
FIG. 10 illustrates the hierarchy generated by the present invention for the content shown in FIGS. 6–9.
FIG. 11 is a flow chart illustrating a preferred embodiment of the present invention that does not include the use of mapped categories.

FIG. 10 shows the hierarchy created by enhanced mapping of the document shown in FIG. 6. The Categories 1010 include Portfolios 710, Weather 810, and my Front Page Headlines 910. The First-level of Links 1020 includes Quotes 720 within the Portfolios 710 category, Salt Lake City, Utah 820 within the Weather 810 category, and Top Stories from Reuters 920, Tech News from News.com 930, and Top Sport Stories from AP 940 within the my Front Page Headlines 910 category. The Second-level of Links 1030 includes DJIA 730 and NASDAQ 750 within the Quotes 720 first-level of Portfolios 710 and the individual story headlines 922–926, 932–936, 942–946 within the first-level links Top Stories from Reuters 920, Tech News from News.com 930, and Top Sport Stories from AP 940 all within the My Front Page Headlines 910 category. The Text of Stories 1040 are documents that are produced by selecting any of the Second-level Links 1030.

In step 550, Text to Speech 420 generates the audio representation that corresponds to the document. It is not necessary that all of the audio representation be generated at one time. For example, a portion of the audio may be generated and communicated to the client while another portion is being generated. The audio may also be generated on demand as each level in the mapped hierarchy is accessed.

Next, in steps 560–590, Text to Speech 420 prompts the client to make various selections from categories 1010, First-level Links 1020, and Second-level Links 1030 to reach Text of Stories 1040. Again, some of these prompts may be prerecorded. Because each of the categories shown in FIGS. 7–9 includes options that may not be relevant to or available in other categories, steps 560–590 will be discussed separately for FIG. 7, FIG. 8, and FIG. 9. Thus, steps 560–590 represent all possible choices. For certain documents, some of the steps may not be required. The foregoing description presumes that the selections made in steps 560–580 do not result in a document that is mapped.

Assuming that a client chooses Portfolios 710 in response to the category selection prompt in step 560, the following will occur. Because Portfolios 710 includes only a single first-level link, Quotes 710, prompting in step 570 is skipped, but the text of Quotes 710 played, and the client will be prompted to select a second-level link, either DJIA 730 or NASDAQ 750 (i.e., "Quotes, please choose from DJIA or NASDAQ"). In step 590, choosing DJIA 730 will play audio of Text 740 and choosing NASDAQ 750 will play audio of Text 760. However, DJIA 730 and NASDAQ 750 are also links. Although choosing the Links global command would not alter the choices offered, it would alter the action taken by making a selection. In this case choosing DJIA 730 or NASDAQ 750 would follow the respective links rather than playing the audio representation of Text 740 or Text 760.

Selecting Weather 810 at step 560 similarly leads to skipped steps. However, in this case, both steps 570 and steps 580 are skipped because Salt Lake City, Utah 820 is the only first-level link and there are no second-level links. Therefore, selecting Weather 810 will result in the audio representation of Text 830 being played (i.e., "Salt Lake City, Utah, 49 to 82 F") at step 590. A Links command could also be issued here to identify Salt Lake City, Utah 820, but the link would only be followed if the client explicitly selected it.

In contrast, selecting My Front Page Headlines 910 at step 560 does not result in any skipped steps. In step 570, the client will be prompted to select from the first-level links Top Stories from Reuters 920, Tech News from News.com 930, and Top Sports Stories from AP 940. Selecting any of these first-level links in step 570 will result in step 580 prompting for the stories associated with the first-level link. For example, selecting Top Sport Stories from AP 940 in step 570 will lead to step 580 prompting the client to select from NL Playoffs Notebook 942, NFL Roundup 944, and America's Cup Enters Third Day 946. In step 590, an audio representation of the document text corresponding to the selection made in step 580 will be played to the client.

Portfolios 710, Weather 810, and My Front Page Headlines 910 present a large amount of information to the client. As the client moves from one category to another, each category presents an increasing number of links or options. In a visual environment, it is a relatively simple matter for the client to scan a page and remember the links or options that are currently available. However, in an audio representation, it is significantly more difficult to keep the links and options of one page separate from the links and options of another page. Therefore, one aspect of the present invention accumulates all links and options from certain pages that are visited and makes the accumulated links and options of a previously visited page available in a subsequent page.

Accumulation is desirable because "pages" are a visual motif that does not necessarily carry over into an audio representation. Particularly in a personal home page environment, a client may view the personal home page as simply a monolithic source of information. Someone familiar with the available content who is moving between various levels in the hierarchy, may find an explicit requirement of returning to a particular page, for the sole purpose of selecting a link or other option from that page, cumbersome or even annoying. Therefore, accumulation preserves the organizational benefits of hierarchical organization-the client continues to be informed regarding the content of a particular page-without limiting the availability of links to only those present on the particular page.

For example, selecting the NL Playoffs Notebook 942 link of Top Sport Stories from AP 940 found in the category My Front Page Headlines 910, will lead to the NL Playoffs Notebook document. That document contains both text and links that are available to the client. In a typical visual browser, if the client next wanted to choose category Weather 810, the user would need to return to Web Page 600 first. However, the present invention, by accumulating links, would allow the client to select Weather 810 from the NL Playoffs Notebook document since Web Page 600 had been previously visited. In a preferred embodiment, accumulation is limited to certain predetermined Web content that would benefit from the feature, such as personal home pages.

In contrast to FIG. 5, FIG. 11 is a flow chart illustrating the operation of a preferred embodiment of the present invention that provides only the default mapping of separating text and links. In step 1110, a client selects the option of starting with a list of favorite Internet sites. Text to Speech 420 prompts the user to select one of the sites listed, step 1120. As before, in step 1130 the document is retrieved using the protocols that are appropriate given the document's location. Again, as before, the content is parsed in step 1140 to identify any title, any links, any link names, and any text included in the document.

Figure 12:
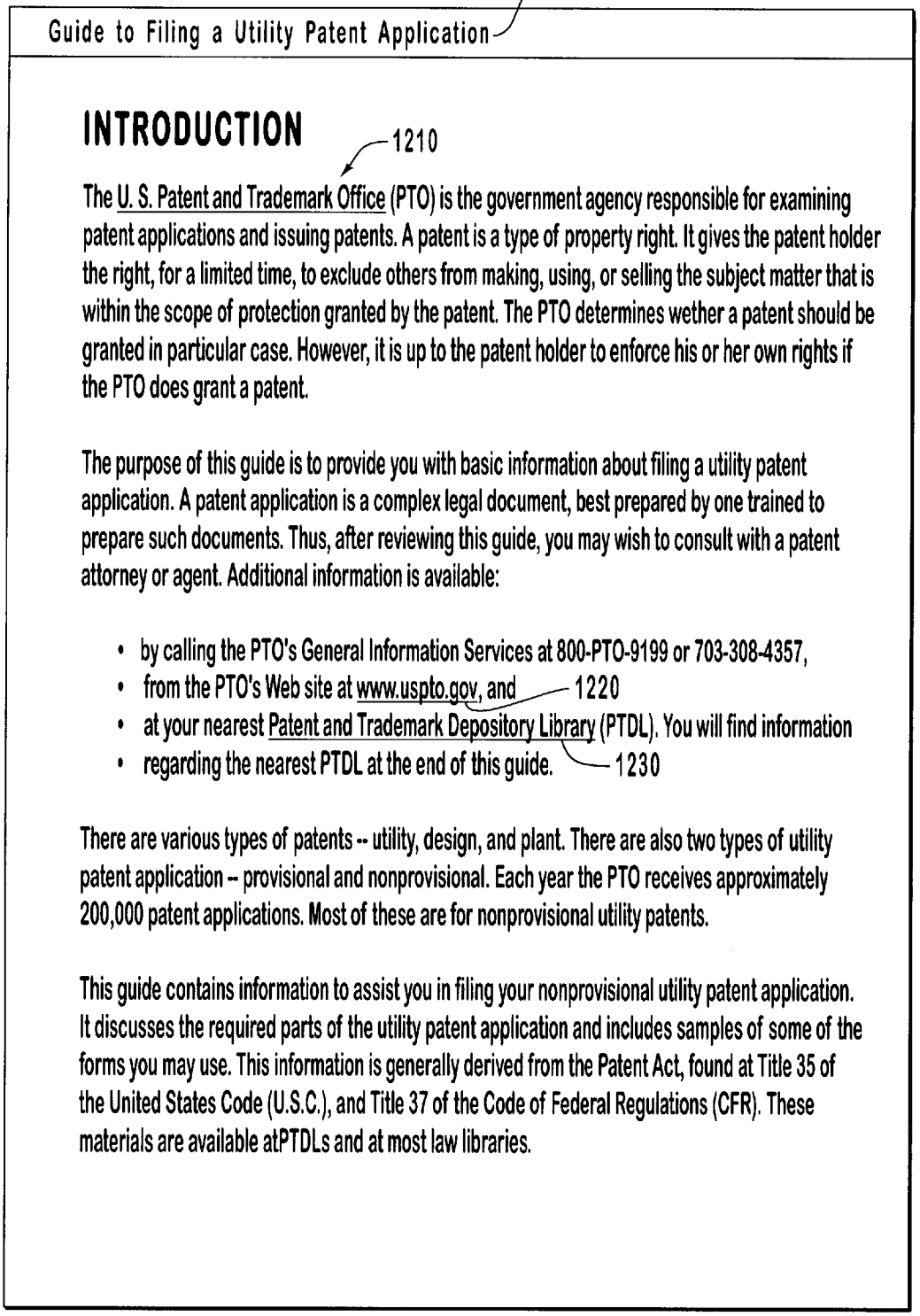
FIG. 12 is an example of electronic content that is used to describe the operation of the preferred embodiment illustrated in FIG. 11.

FIG. 12 is an example of Electronic Content 1200 that is useful in describing the embodiment disclosed in FIG. 11. Parsing step 1140 identifies title 1240 (HTML titles are indicated by explicit tags), links and corresponding link names 1210, 1220, and 1230, as well as the document text. With these various elements identified, audio representation of Electronic Content 1200 is generated in step 1150. Once generated, the document title is reported in step 1160 and is followed by reporting the number of links in step 1170.

Just as with the description of FIG. 5, parsing the retrieved document to identify any title, any text, any links, and any corresponding link names that may be present shows how an audio interface may be provided without requiring changes to the document source. Together with the other aspect of the present invention, this provides immediate audio access to dynamic, visually-oriented, content that otherwise would be inaccessible to the prior art.

In the case of the Electronic Content 1200, the present invention reports the document title as Guide to Filing a Utility Patent Application 1240. There are three links, named U.S. Patent and Trademark Office 1210, www.uspto.gov 1220, and Patent and Trademark Depository Library 1230. Then, in step 1180, an audio representation of the electronic document's text is played for or communicated to the user. In the case of Electronic Content 1200, this text includes everything except the title 1240. The client may also choose the global Links command, to hear an audio representation of the three links, 1210, 1220, and 1230. By choosing a link, the client instructs the present invention to follow the link, as in step 1120, beginning audio interface process anew at step 1130.

The present invention may be embodied in other forms without departing from its spirit or essential characteristics. As properly understood, the preceding description of specific embodiments is illustrative only and in no way restrictive. For example, using Web pages accessible over the Internet to describe the present invention does not limit the invention to any specific format of electronic content or any particular means of accessing electronic content. The scope of the invention is, therefore, indicated by the appended claims as follows.

What is claimed and desired to be secured by United States Letters Patent is:

1. In a system that includes an information service and a telephone for interacting with the information service, a method of enabling a user of the telephone to access and navigate electronic documents by presenting to the user an audio representation of a hierarchy of links of the document so as to enhance the ability of the user to navigate the electronic documents, the method comprising the acts of:

obtaining an electronic document;

parsing the electronic document to identify any text and any links included in the content of the electronic document;

mapping content of the parsed electronic document by performing the acts of:

determining whether the text and links included in the content of the document represent categories, first-level links and second-level links in a hierarchical relationship one with another; and to the extent that the text and links represent categories, first-level links and second level links, creating a hierarchical data structure that associates the text and links to the categories, the first-level links and the second-level links;

generating an audio representation of at least a portion of the parsed electronic document, the audio representation being communicated to a client; and prompting the user to select a category from the hierarchical data structure and then successively prompting the user to select any first-level links and second-level links, such that the content of the electronic document is presented audibly to the user and the user can make verbal selections.

2. A method as recited in claim 1 further comprising the acts of:

obtaining at least two electronic documents, one of the at least two electronic documents being designated as a prior electronic document and one of the at least two electronic documents being designated as a subsequent electronic document;

parsing the at least two electronic documents to identify any text and any links included in the at least two electronic documents; and making any links identified in the prior electronic document available in the subsequent electronic document.

3. A method as recited in claim 1 further comprising the acts of generating an audio representation of the one or more categories.

4. A method as recited in claim 3 further comprising the act of prompting the client to select one of the one or more categories.

5. A method as recited in claim 1 wherein the act of mapping includes creating a hierarchy of said any text and said any links.

6. A method as recited in claim 1 further comprising the act of receiving an instruction from the client.

7. A method as recited in claim 6 wherein the instruction received from the client is at least one of an instruction to email, fax, or voice mail at least a portion of the electronic document to a third party selected from the client's contact list.

8. A method as recited in claim 6 wherein the instruction is spoken into the input/output device.

9. A method as recited in claim 6 wherein the audio representation includes at least one link and wherein the instruction from the client is to select the at least one link, further comprising the act of following the at least one link.

10. A method as recited in claim 1 wherein the audio representation includes only said links included in the electronic document.

11. A method as recited in claim 1 wherein the audio representation includes a count of said links and said text included in the electronic document.

12. A method as recited in claim 1 wherein the electronic document is written in a markup language.

13. A method as recited in claim 12 wherein the markup language includes elements that are only capable of describing the visual appearance of the electronic document.

14. A method as recited in claim 13 wherein the markup language is one of hypertext markup language and extensible markup language.

15. A method as recited in claim 1 further comprising the act of providing the user with a visual representation of the electronic document simultaneously with the act of generating the audio representation.

16. In an information system that has access, through the Internet, to electronic documents, wherein the electronic documents are written in a markup language having elements that are only capable of describing the visual appearance of the electronic documents, and the information system is connected to a client by a telephony infrastructure, a method for providing the user with telephone access to the electronic documents, the method comprising the acts of:

obtaining an electronic document through the Internet;

parsing the electronic document to identify any text and any links included in the content of the electronic document;

mapping content of the parsed electronic document by performing the acts of:

determining whether the text and links included in the content of the document represent categories, first-level links and second-level links in a hierarchical relationship one with another; and to the extent that the text and links represent categories, first-level links and second level links, creating a hierarchical data structure that associates the text and links to the categories, the first-level links and the second-level links;

prompting the client to traverse the hierarchical data structure, including automatically selecting any category and any associated link when exactly one category and exactly one associated link is present;

receiving input from the client to traverse the hierarchical data structure, wherein the input includes instructions for selecting an electronic document with text; and generating an audio representation of the parsed electronic document, including a count of any links and any text present in the electronic document, the audio representation being communicated to the client.

17. A method as recited in claim 16, wherein the instruction is spoken into the telephone.

18. A method as recited in claim 17, wherein the input further includes at least one of an instruction to email, fax, or voice mail at least a portion of the electronic document to a third party selected from a contact list of the client.

19. A method as recited in claim 17, wherein the audio representation includes information representing at least one link and wherein the input includes an instruction to select the at least one link, the method further comprising the act of following the at least one link.

20. A method as recited in claim 16 further comprising the act of providing the user with a visual representation of the electronic document simultaneously with the act of generating the audio representation.

21. A system providing access, through an audio interface, to electronic documents so as to enable a user of the audio interface to access and navigate the electronic documents by presenting to the user a hierarchy of links of the document, the system comprising:

processor means for obtaining an electronic document;

processor means for parsing the electronic document to identify any text and any links included in the content of the electronic document;

processor means for mapping content of the parsed electronic document by performing the acts of:
   determining whether the text and links included in the content of the document represent categories, first-level links and second-level links in a hierarchical relationship one with another; and
   to the extent that the text and links represent categories, first-level links and second level links, creating a hierarchical data structure that associates the text and links to the categories, the first-level links and the second-level links;

processor means for generating an audio representation of at least a portion of the parsed electronic document, the audio representation being communicated to a client; and processor means for prompting the user to select a category from the hierarchical data structure and then successively prompting the user to select any first-level links and second-level links, such that the content of the electronic document is presented audibly to the user and the user can make verbal selections.

22. A system as recited in claim 21 further comprising processor means for receiving spoken input from the user.

23. A system as recited in claim 22 wherein the input comprises at least one of an instruction to email, fax, or voice mail at least a portion of the electronic document to a third party selected from a contact list of the client.

24. A system as recited in claim 22 wherein the audio representation includes information representing at least one link and wherein the input includes an instruction to select the at least one link, the system further comprising processor means for following the at least one link.

25. A computer program product for providing access, through an audio interface, to electronic documents so as to enable a user of the audio interface to access and navigate the electronic documents by presenting to the user a hierarchy of links of the document, the computer program product comprising:

a computer-readable medium carrying computer-executable instructions for implementing the method, the computer-executable instructions comprising:
   program code means for obtaining an electronic document;
   program code means for parsing the electronic document to identify any text and any links included in the content of the electronic document;
   program code means for mapping content of the parsed electronic document by performing the acts of:
      determining whether the text and links included in the content of the document represent categories, first-level links and second-level links in a hierarchical relationship one with another; and
      to the extent that the text and links represent categories, first-level links and second level links, creating a hierarchical data structure that associates the text and links to the categories, the first-level links and the second-level links;
   program code means for generating an audio representation of at least a portion of the parsed electronic document, the audio representation being communicated to a client; and
   program code means for prompting the user to select a category from the hierarchical data structure and then successively prompting the user to select any first-level links and second-level links, such that the content of the electronic document is presented audibly to the user and the user can make verbal selections.

26. A computer-readable medium as recited in claim 25 wherein the computer-executable instruction further comprises program code means for receiving spoken input from the user.

27. A computer-readable medium as recited in claim 26 wherein the input comprises at least one of instruction to email, fax, or voice mail at least a portion of the electronic document to a third party selected from a contact list of the client.

28. A computer-readable medium as recited in claim 26 wherein the audio representaion includes information representing at least one link and wherein the input includes an instruction to select the at least one link, wherein the computer-executable instruction further comprise program code means for following the at least one link.

* * * * *